(12) United States Patent
Mori et al.

(10) Patent No.: US 10,416,612 B2
(45) Date of Patent: Sep. 17, 2019

(54) CONTROL DEVICE AND METHOD FOR TUNING A SERVO MOTOR

(71) Applicant: OMRON Corporation, Kyoto (JP)

(72) Inventors: Yasumoto Mori, Joyo (JP); Mamoru Egi, Otsu (JP); Fumiaki Sato, Kyoto (JP); Aimar Arrate, Barcelona (ES); Pere Llibre, Catalunya (ES); Federico Heras, Catalunya (ES)

(73) Assignee: OMRON Corporation, Kyoto (JP)

( * ) Notice: Subject to any disclaimer, the term of this patent is extended or adjusted under 35 U.S.C. 154(b) by 303 days.

(21) Appl. No.: 15/410,779

(22) Filed: Jan. 20, 2017

(65) Prior Publication Data

US 2017/0261946 A1   Sep. 14, 2017

(30) Foreign Application Priority Data

Mar. 14, 2016   (EP) ..................................... 16382113

(51) Int. Cl.
    *G05B 6/02*   (2006.01)
    *G05B 13/02*   (2006.01)
(52) U.S. Cl.
    CPC .............. *G05B 6/02* (2013.01); *G05B 13/024* (2013.01)
(58) Field of Classification Search
    CPC ........ G05B 19/416; G05B 2219/41025; H02P 23/04
    See application file for complete search history.

(56) References Cited

U.S. PATENT DOCUMENTS

| 5,153,807 A | 10/1992 | Saito et al. |
| 5,213,077 A * | 5/1993 | Nishizawa ............ F02D 31/003 123/339.21 |

(Continued)

FOREIGN PATENT DOCUMENTS

| JP | H04186401 | 7/1992 |
| JP | H05173605 | 7/1993 |

(Continued)

OTHER PUBLICATIONS

"Office Action of Japan Counterpart Application," dated Jan. 9, 2018, with English translation thereof, p. 1-p. 9.

(Continued)

*Primary Examiner* — Shawki S Ismail
*Assistant Examiner* — Zoheb S Imtiaz
(74) *Attorney, Agent, or Firm* — JCIPRNET (57) ABSTRACT

A control device for tuning a servo motor is suggested. The control device comprises a calculation unit configured to determine a current proportional speed gain of the servo motor and to calculate a stabilization time ratio based on a current stabilization time of the servo motor and a target stabilization time, a determination unit configured to select a gain determination process based on the calculated stabilization time ratio, to determine a next proportional speed gain using the selected gain determination process starting from the current proportional speed gain, wherein the calculation unit is further configured to update parameters of the servo motor according to the determined next proportional speed gain, and a control unit configured to generate a control signal for controlling the servo motor for driving a load based on the updated parameters.

17 Claims, 4 Drawing Sheets

(56) References Cited

U.S. PATENT DOCUMENTS

| | | | | |
|---|---|---|---|---|
| 5,610,489 A * | 3/1997 | Hart | ................. | G05B 19/19 |
| | | | | 318/571 |
| 5,684,374 A * | 11/1997 | Chaffee | ............. | G05B 19/19 |
| | | | | 318/609 |
| 7,328,138 B1 * | 2/2008 | Trabert | ............. | G11B 5/584 |
| | | | | 360/77.04 |
| 2006/0087275 A1 * | 4/2006 | Sato | ................ | G05B 19/416 |
| | | | | 318/623 |
| 2011/0050146 A1 * | 3/2011 | Okita | ............ | G05B 19/404 |
| | | | | 318/631 |
| 2016/0231730 A1 * | 8/2016 | Wakana | .......... | G05B 19/409 |
| 2016/0292349 A1 * | 10/2016 | Kainuma | ........ | G05B 19/401 |

FOREIGN PATENT DOCUMENTS

| | | |
|---|---|---|
| JP | H06242803 | 9/1994 |
| JP | H07319506 | 12/1995 |
| JP | 2006190202 | 7/2006 |
| JP | 2006302297 | 11/2006 |
| JP | 2008259271 | 10/2008 |
| JP | 2014204622 | 10/2014 |

OTHER PUBLICATIONS

"The Extended European Search Report of European Counterpart Application", dated Sep. 7, 2016, pp. 1-8.

"Office Action of Japan Counterpart Application," with machine English translation thereof, dated Sep. 4, 2018, p. 1-p. 6.

Office Action of China Counterpart Application, with English translation thereof, dated Dec. 14, 2018, pp. 1-17.

* cited by examiner

CONTROL DEVICE AND METHOD FOR TUNING A SERVO MOTOR

CROSS-REFERENCE TO RELATED APPLICATION

This application claims the priority benefit of European application no. 16382113.5, filed on Mar. 14, 2016. The entirety of the above-mentioned patent applications is hereby incorporated by reference herein and made a part of this specification.

FIELD OF THE INVENTION

The present invention relates to a control device for tuning a servo motor and a corresponding method for tuning a servo motor.

BACKGROUND OF THE INVENTION

A servo motor for moving a load is controlled by a controller for controlling, using a drive current or control signal, the servo motor which drives a mechanical load. The controller and the servo motor are implemented as a closed loop system. The controller generates a control signal instructing the motor to move the mechanical load. The control signal applied depends on the motion application type (motor is moved to a desired position at a desired velocity, motor speed is varied, or the torque applied is varied). A feedback signal from the motor to the controller indicates the current actual state (e. g., position, velocity, etc.) of the motor and/or load. The feedback signal can be originated by an encoder or a resolver attached to the motor, by measuring the load position, or by estimation. The controller then compares the actual position of the load (feedback signal) with the instructed target position (control signal), and adjusts the newly calculated control signal as needed to minimize the differences between both signals (actual and target positions). This is continued until the target position is reached.

Thus, at the beginning of a movement, the motor/load accelerates/decelerates, i.e. changes speed, in order to reach the target position. After that, the motor/load requires a so-called stabilization time which can be defined as the period of time required by the motor to reach a halt status of the motor/load after having arrived at the target position.

Further, in the controller, gain affects the accuracy (i.e. how close to the desired speed or position the motor's actual speed or position is). A high gain will allow an accurate movement. In order that the motor will perform without excessive overshoot and settle within adequate time periods, the servo motor is tuned, including the tuning of the servo motor's proportional speed gain.

The controller may implement for example a PID filter for calculating the control signal that is applied to the motor. When tuning the servo motor, parameters of the PID filter are tuned. These parameters may include the proportional speed gain, a proportional position gain, a velocity control gain, the torque command filter and a position command filter. The proportional speed gain may be understood as the primary parameter. The responsiveness of the servo motor (stiff or soft) is determined by the proportional speed gain.

SUMMARY OF THE INVENTION

The present invention provides a device and method for tuning a servo motor in which the responsiveness of the servo motor is increased whilst the stabilization time is as low as possible while avoiding excessive overshoot.

Accordingly, a control device for tuning a servo motor is suggested. The control device comprises a calculation unit configured to determine a current proportional speed gain of the servo motor and to calculate a stabilization time ratio based on a current stabilization time of the servo motor and a target stabilization time, a determination unit configured to select a gain determination process based on the calculated stabilization time ratio, to determine a next proportional speed gain using the selected gain determination process starting from the current proportional speed gain, wherein the calculation unit is further configured to update parameters of the servo motor according to the determined next proportional speed gain, and a control unit configured to generate a control signal for controlling the servo motor for driving a load based on the updated parameters.

As explained above, gain affects the accuracy of the servo motor. Thus, the gain, in particular the proportional speed gain of the servo motor, is responsible for how close the motor will come to the desired speed or position. A high gain will allow an accurate movement. Further parameters of the servo motor depend on the proportional speed gain and are determined accordingly.

Thus, in order to avoid overshoot of the motor, the proportional speed gain is adapted in a closed loop system provided by the control device. The control device may implement for example a PID filter for calculating the control signal that is applied to the motor. If the proportional speed gain $K_{vp}$ is updated due to this closed loop system, the parameters which depend on $K_{vp}$ will also be updated.

As the stabilization time should be reduced, a target stabilization time may be input to the control device, for example by a user input. The target stabilization time may define the time which is acceptable as the period of time required by the motor to reach a halt status of the motor/load after having arrived at the target position. The target position is the position which should be reached by the motor/load according to a user input or control of the servo motor.

According to the herein described control device, the proportional speed gain, or more precisely, the next proportional speed gain, is calculated based on a stabilization time ratio. The stabilization time ratio defines how far away the current stabilization time is from the target stabilization time. Depending on that, a gain determination process is selected. According to the gain determination process, the next proportional speed gain $K_{n+1}$ is calculated.

Afterwards, the parameters depending on $K_{vp}$ are updated according to $K_{n+1}$. The updated parameters, including the next proportional speed gain, are included into a control signal. The control unit then sends the control signal to the motor for continuing the movement according to the updated parameters.

It should be noted that, in the following the terms motor and servo motor are used synonymously. Further, a movement of the load includes a movement of the motor and vice versa.

According to an embodiment, the calculation unit is adapted to initially determine the current proportional speed gain as a fixed initial proportional speed gain based on a user input.

At the beginning, the control device does not have any information with respect to the current proportional speed gain. The initial value of the proportional speed gain, i.e. the value for starting the tuning, is set to a fixed and low value. After the first loop, i.e. after the stabilization time ratio is calculated for the first time, the proportional speed gain is updated to the current true value.

According to a further embodiment, the control device comprises a graphical user interface for receiving the user input. The graphical user interface may also provide the possibility to start the whole tuning mechanism and/or to input further parameters like the target stabilization time.

According to a further embodiment, the calculation unit is adapted to initially receive the current proportional speed gain based on an inertia estimation of the servo motor.

The inertia estimation and the calculation of the current proportional speed gain may be done in the drive control of the servo motor and may be provided to the control device.

The user may choose whether the calculation unit receives the initial proportional speed gain from a user input via the graphical user interface or whether the calculation unit receives the initial proportional speed gain based on an inertia estimation of the servo motor. Both embodiments may also be combined.

According to a further embodiment, the control device further comprises a detection unit configured to detect whether vibrations affect the servo motor and/or the load and to send a signal to the servo motor for eliminating the detected vibrations.

Vibrations or other abnormal activities of the motor and/or load may occur during the movement of the motor and/or load. Such vibrations or resonances may happen at some point during the movement and may be present during the calculation of the next proportional speed gain by the determination unit. In order to detect vibrations, the detection unit may monitor the servo motor.

According to a further embodiment, the detection unit is configured to detect a vibration if a deviation of the motor speed between a motor speed command and a motor speed feedback is larger than an acceptable criterion.

The detection unit may determine whether there are any vibrations based on the motor speed command and the motor speed feedback. If the difference between these values is larger than a predefined criterion, this indicates vibrations.

In addition, it is also possible for the detection unit to determine whether there are any vibrations based on the torque command value which is calculated from the speed deviation between the motor speed command and the motor speed feedback. When using the torque command value, an acceptable criterion is indicated % of rated torque of the motor. For example the acceptable criterion is 3% of rated torque of the motor.

According to a further embodiment, the detection unit is configured to detect a vibration if the occurrence number of the zero-cross for the deviation of motor speed is within an acceptable range.

In this embodiment, vibrations may be detected by monitoring zero-crossings of the deviation of the motor speed.

In addition, it is also possible for the detection unit to detect a vibration by the occurrence numbers of the zero-cross of the torque command value which is calculated from the speed deviation between the motor speed command and the motor speed feedback.

According to a further embodiment, the detection unit is configured to compare the current proportional speed gain and the next proportional speed gain.

If vibrations are detected, the detection unit may confirm whether these vibrations can be eliminated by applying filters by comparing the current proportional speed gain and the next proportional speed gain. The current proportional speed gain may be directly derived from the motor. If the current proportional speed gain is larger than the newly calculated next proportional speed gain, the detection unit can confirm that there are vibrations and send a signal to the motor for eliminating these vibrations. The elimination may be done directly in the motor by applying for example a filter to remove resonances in the control signal.

According to a further embodiment, if the current proportional speed gain is larger than the next proportional speed gain, the detection unit is configured to send a signal to the control unit to generate the control signal based on the previous parameters in case of detected vibrations.

As long as the vibrations are not eliminated, the detection unit may instruct the control unit to use the previous parameters, i.e. not the updated parameters, for the generation of the control signal or abort the tuning process after n-th trail operation to indicate the failure of the operation according to the user inputs.

According to a further embodiment, the detection unit is configured to send a signal to the determination unit to determine the next proportional speed gain after the detected vibrations are eliminated.

After the vibrations are eliminated, the detection unit may send a signal to the determination unit for continuing the determination of the next proportional speed gain and update of the further parameters.

According to a further embodiment, the calculation unit is configured to calculate the stabilization time ratio as the quotient between the current stabilization time and the target stabilization time.

According to a further embodiment, the calculation unit, the determination unit and the control unit are configured to repeat their functions until the current stabilization time is equal to the target stabilization time.

If the stabilization time ratio is equal to one or less than one, the target stabilization time has been reached and the acceptance criteria for the movement of the motor/load have been reached. At this point, the tuning of the servo motor will be ended.

According to a further embodiment, the determination unit is configured to apply a skip step gain determination process as the selected gain determination process if the stabilization time ratio is above a predetermined reference value.

When the current stabilization time is far from the target stabilization time, the determination unit applies the skip step gain determination process. The skip step gain determination process results in a large increase of the proportional speed gain.

The predetermined reference value may be for example $\alpha^{2\chi}$. $\alpha$ may be a predefined coefficient which can be set according to the used servo motor and the characteristics of the used servo motor. $\chi$ may be considered as a "tuning" factor for the skip step gain determination process. In order to prevent an excessive gain operation by determining a large stabilization time ratio resulting in a large proportional speed gain change, $\chi$ may be set accordingly, for example to 2 or about 2.

According to a further embodiment, the skip step gain determination process defines that the next proportional speed gain is calculated as a function dependent on the stabilization time ratio and a predetermined parameter.

In particular, the next proportional speed gain may be calculated as a product of the current proportional speed gain, the root of the stabilization time ratio and a predetermined parameter. The root of the stabilization time ratio may be the $2\chi$th root of the stabilization time ratio, but may also be any other root of the stabilization time ratio which can be defined based on the servo motor characteristics. The predetermined parameter may depend on the predefined coefficient α and may be for example a maximum value of α.

According to a further embodiment, the determination unit is configured to apply a one step gain determination process as the selected gain determination process if the stabilization time ratio is below a predetermined reference value.

When the stabilization time is close to the target stabilization time, the determination unit applies a one step gain determination process which results in a smaller increase of the proportional speed gain than when the skip step gain determination process is applied.

The predetermined reference value is the same as for the skip step gain determination process, and may be for example $\alpha^{2x}$.

According to a further embodiment, the one step gain determination process defines that the next proportional speed gain is calculated as a function independent on the stabilization time ratio.

In particular, the next proportional speed gain may be calculated as a product of the current proportional speed gain and a predetermined parameter. The predetermined parameter may be for example the predefined coefficient α. The maximum value of α may be for example 2, if α is set to a smaller value, the proportional speed gain may be adjusted finely but the number of required changes is increased. Thus, α may be set according to a user input, depending on the servo motor, the intended use or other considerations.

According to a further embodiment, the determination unit is configured to compare the next proportional speed gain of the one step gain determination process and the next proportional speed gain of the skip step gain determination process.

According to a further embodiment, if the next proportional speed gain of the one step gain determination process is larger than the next proportional speed gain of the skip step gain determination process, the determination unit is configured to use the next proportional speed gain of the one step gain determination process.

In addition to the determination of the next proportional speed gain based on the selected gain determination process, the determination unit provides a safety feature. The determination unit calculates the next proportional speed gain of the one step gain determination process and the next proportional speed gain of the skip step gain determination process and compares the two results. If the determination unit has selected the skip step gain determination process but the next proportional speed gain according to the one step gain determination process is larger than the next proportional speed gain according to the skip step gain determination process, the determination unit is configured to override the first result of the next proportional speed gain and use next proportional speed gain according to the one step gain determination process. In this way, it can be avoided that the skip step gain determination process is used although the one step gain determination process would be more suitable.

According to a further embodiment, the parameters are at least one of a proportional position gain, a velocity control gain, a torque command filter and a position command filter.

These and other parameters which are necessary for the control and function of the servo motor depend on the proportional speed gain. Thus, when updating the proportional speed gain, these parameters can be updated accordingly and can be used for the further movement of the motor.

According to a further aspect, the invention relates to a method for tuning a servo motor. The method comprises the following steps: determining a current proportional speed gain of the servo motor, calculating a stabilization time ratio based on a current stabilization time of the servo motor and a target stabilization time, selecting a gain determination process based on the calculated stabilization time ratio, determining a next proportional speed gain using the selected gain determination process starting from the current proportional speed gain, updating parameters of the servo motor according to the determined next proportional speed gain, and generating a control signal for controlling the servo motor for driving a load based on the updated parameters.

The embodiments and features described with reference to the device of the present invention apply mutatis mutandis to the method of the present invention.

According to a further aspect, the invention relates to a computer program product comprising a program code for executing the above-described method for tuning a servo motor when run on at least one computer.

A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

BRIEF DESCRIPTION OF THE DRAWINGS

Further embodiments, features and advantages of the present invention will become apparent from the subsequent description and dependent claims, taken in conjunction with the accompanying drawings, in which:

In the Figures, like reference numerals designate like or functionally equivalent elements, unless otherwise indicated.

EMBODIMENTS OF THE INVENTION

Figure 1:
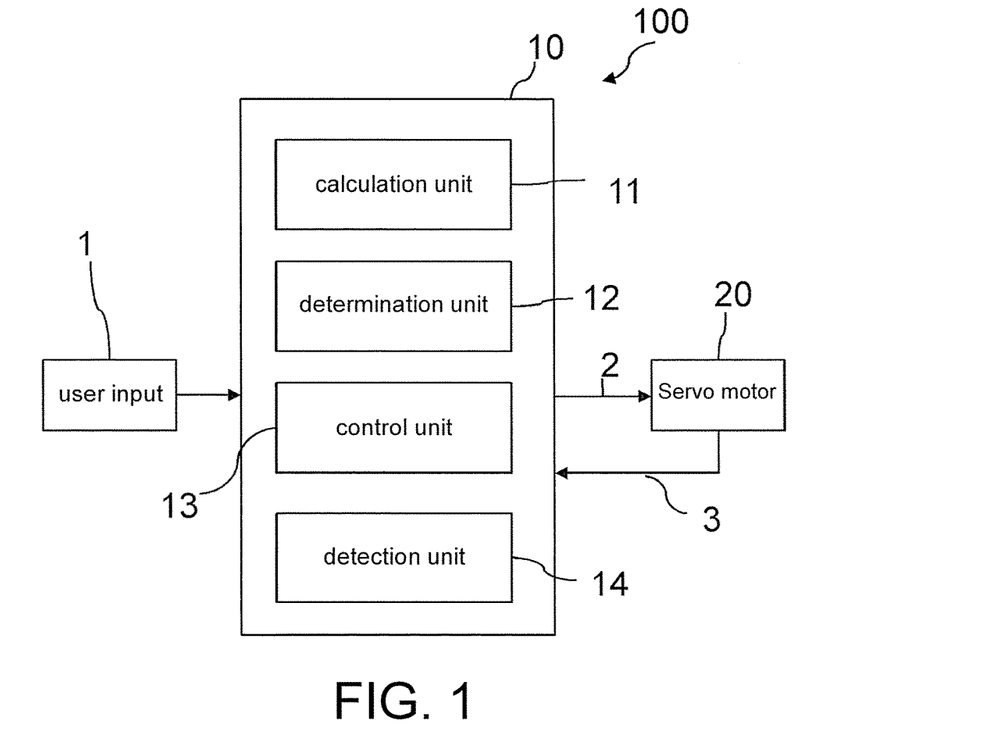
FIG. 1 shows a servo motor system comprising a servo motor and a control device for tuning and controlling the servo motor.

FIG. 1 shows a servo motor system 100 comprising a servo motor 20 and a control device 10 for tuning and controlling the servo motor 20.

The control device 10 can receive a user input 1, which can be input via a graphical user interface. The user input 1 can comprise information with respect to a movement of the servo motor 20, which can move a load (not shown). In order to control and tune the servo motor 20, the control device 10 sends a control signal 2 to the servo motor 20. On the other hand, the servo motor 20 sends a feedback signal 3 to the control device 10. The control device 10 can use the feedback signal 3 for further control of the servo motor 20 and also for tuning the servo motor 20.

The control device 10 comprises a calculation unit 11, a determination unit 12, a control unit 13 and a detection unit 14. The features and functions of these units will be described briefly in the following and in further detail with reference to the FIGS. 3 and 4.

The calculation unit 11 determines a current proportional speed gain $K_{vp}$ of the servo motor 20, for example based on the feedback signal 3, and calculates a stabilization time ratio based on a current stabilization time of the servo motor 20 and a target stabilization time.

After that, the determination unit 12 selects a gain determination process based on the calculated stabilization time ratio. The selected gain determination process is then used for determining the next proportional speed gain $K_{n+1}$. The gain determination process may be either a skip step gain determination process or a one step gain determination process.

In the one step gain determination process, the current proportional speed gain is multiplied with a predetermined parameter α to improve the responsiveness of the servo motor 20. α may be set according to a user input. If the value of α is changed to a smaller value, the gain can be adjusted finely but the number of necessary adjustments is increased.

In the skip step gain determination process, the next proportional speed gain $K_{n+1}$ is based on the calculation from the current stabilization time (which can be measured) and the target stabilization time. The increase of the proportional speed gain is typically higher when using the skip step gain determination process compared to the one step gain determination process.

After the determination unit 12 has determined the next proportional speed gain, the calculation unit 11 updates further parameters of the servo motor, for example a proportional position gain, a velocity control gain, a torque command filter and a position command filter. These parameters depend on the proportional speed gain and can therefore be updated accordingly.

Afterwards, the control unit 13 generates the control signal 2 including the updated parameters.

The calculation unit 11, the determination unit 12 and the control unit 13 continue their respective functions, i.e. implement a closed loop control, until the target stabilization time is reached.

During the closed loop control, the detection unit 14 monitors the servo motor 20 in order to detect any vibrations which may affect the determination of the next proportional speed gain. If such vibrations are detected, the detection unit 14 can interrupt the determination unit 12 and inform the servo motor 20 to eliminate the vibrations. If no more vibrations are detected, the detection unit 14 sends a signal to the determination unit 12 to continue with the determination of the next proportional speed gain.

Figure 2:
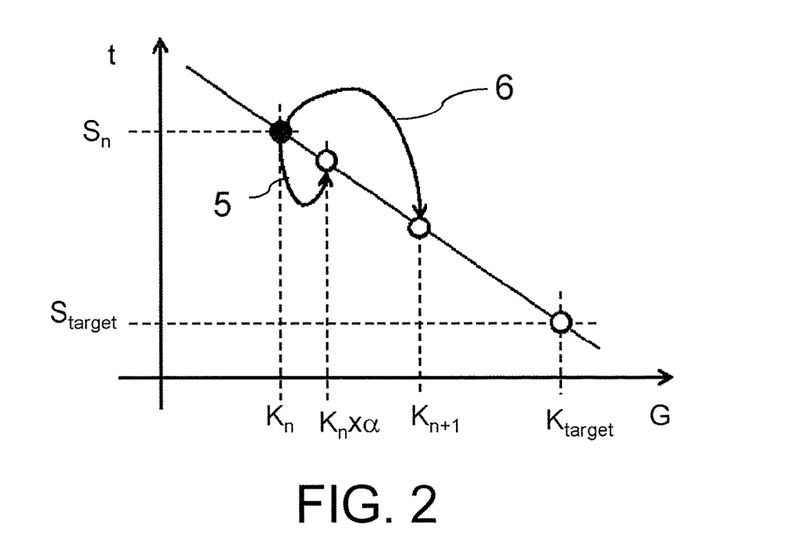
FIG. 2 shows the relationship between the proportional speed gain and the stabilization time of the servo motor system of FIG. 1.

The relationship between the stabilization time (vertical axis) and the proportional speed gain (G, horizontal axis) is illustrated in FIG. 2.

A high stabilization time is related to a low proportional speed gain. On the other hand, a low stabilization time is related to a high proportional speed gain.

At the beginning of the tuning process, the measured stabilization time $S_n$ is high. The current proportional speed gain $K_n$ is low. Starting from this, when the next proportional speed gain $K_{n+1}$ would be calculated by the one step gain determination process (reference sign 5), the increase of the proportional speed gain would be lower as when the next proportional speed gain $K_{n+1}$ would be calculated by the skip step gain determination process (reference sign 6). At the beginning of the tuning process, it is thus appropriate to increase the proportional speed gain by the skip step process, as described above. If the measured stabilization time $S_n$ comes closer to the target stabilization time $S_{target}$, the next proportional speed gain will be determined by the one step gain determination process. Thus, at the beginning, a high increase of the proportional speed gain will occur and later, towards the end of the tuning process, the increase will only be in smaller steps to accurately arrive at an estimated optimal proportional speed gain $K_{target}$, which corresponds to the target stabilization time $S_{target}$.

Figure 3:
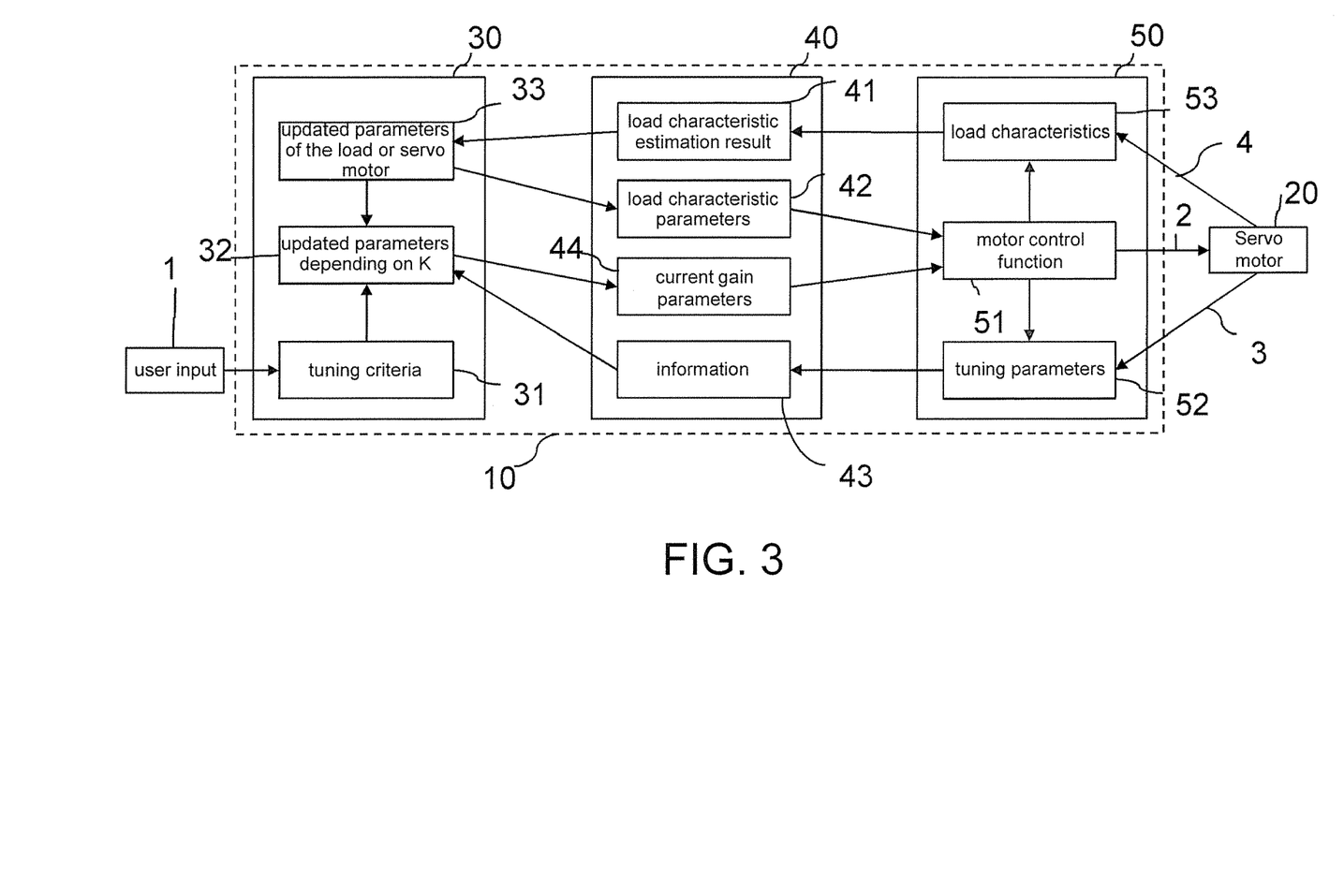
FIG. 3 shows an example of a configuration of the control device.

FIG. 3 shows a logical configuration of the control device 10. The control device 10 comprises three logical sections, a configuration section 30, a drive parameter section 40 and a drive function section 50. All three sections are implemented by the units of FIG. 1.

In the configuration section 30, a user input 1 is processed to extract tuning criteria 31. These tuning criteria may define for example the target stabilization time. Updated parameters 32 depending on the proportional speed gain are generated based on the tuning criteria 31 and updated parameters 33 of the load or servo motor 20.

In the drive parameter section 40, which refers to the parameters being used for driving the servo motor 20, a load characteristic estimation result 41 (i.e., information about the load being moved by the servo motor 20) is forwarded to the configuration section 30 for generating updated parameters 33 of the load or servo motor 20. The drive parameter section also receives the updated parameters 33 of the load or servo motor 20 to be able to forward load characteristic parameters 42 to the drive function section 50.

Further, the drive parameter section 40 receives a tuning measurement 52 from the drive function section 50 and forwards this information 43 for example as stabilization time or overshoot information to the configuration section 30 for generating the updated parameters 32 depending on the proportional speed gain. The updated parameters 32 are received by the drive parameter section 40 for forwarding current gain parameters 44 to the drive function section 50.

The drive function section 50 communicates directly with the servo motor 20 and receives a motor speed 4 as well as the feedback value 3 including information of the proportional speed gain and the stabilization time. A motor control function 51 receives the current gain parameters 44 as well as the load characteristic parameters 42 and generates a control signal 2 for controlling the servo motor 20.

In addition, the motor control function 51, which can be a physical motor control unit being integrated into the control device 10, generates a command value for initiating a measurement of the tuning parameters 52 as well as a command value for estimating the load characteristics 53. This information is sent to the drive parameter section 40.

The control device 10 as described with reference to FIG. 1 implements in particular the functions of the logical drive function section 50.

The functions and features of the control device 10 will now be described in greater detail with respect to FIGS. 4 and 5.

Figure 4:
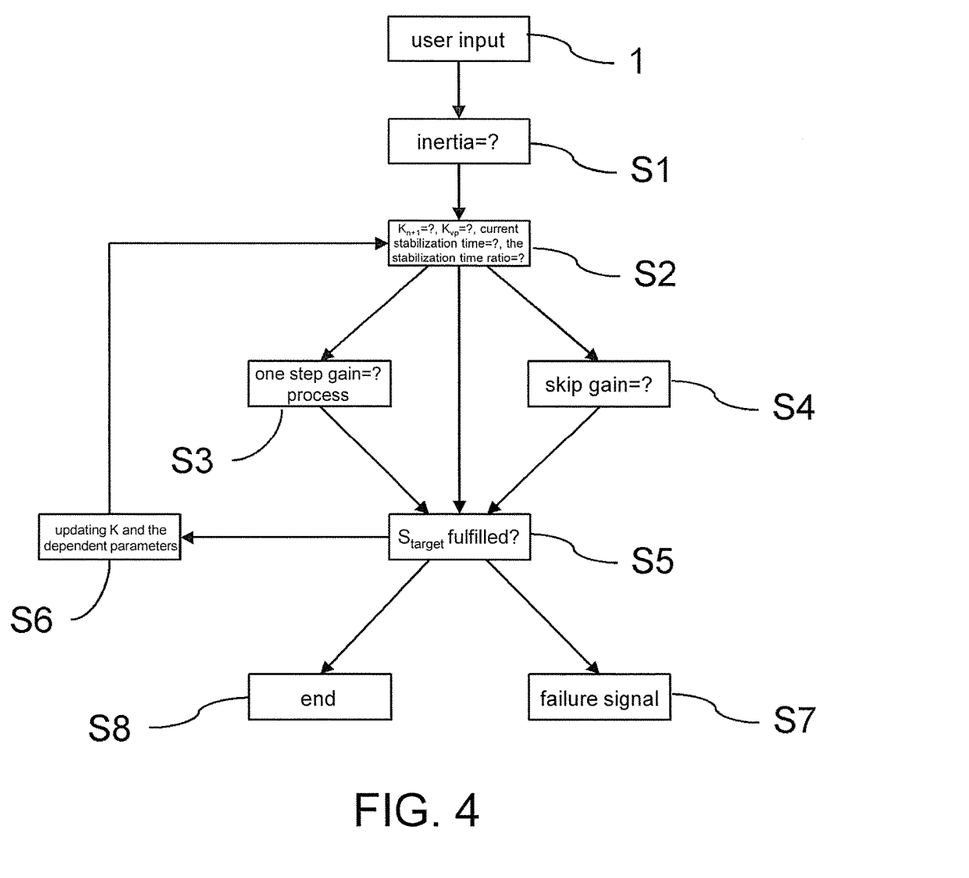
FIG. 4 shows a first example of a method for tuning a servo motor.

FIG. 4 shows a first example of a method for tuning a servo motor 20.

At the beginning, a user input 1 is received. The user input 1 can include information about the movement of the servo motor 20 and may also include tuning information like a target stabilization time.

In step S1, an inertia of the servo motor 20 can be estimated. This step is only optional and can also be omitted.

In step S2, measurements are performed and the next proportional speed gain is determined. Thus, in step S2, the calculation unit 11 determines the current proportional speed gain $K_{vp}$ of the servo motor 20, determines the current stabilization time and calculates the stabilization time ratio based on the current stabilization time and the target stabilization time.

Further, in step S2, the determination unit 12 selects either the one step gain determination process or the skip step gain determination process based on the calculated stabilization time ratio as described above. The selected gain determination process is then used for determining the next proportional speed gain $K_{n+1}$.

In the meantime, resonances and damping are detected and, when present, removed or eliminated in steps S3 and S4. Although S3 and S4 are shown as following step S2, these steps are carried out simultaneously as described above.

In step S5, it will be checked whether the target stabilization time is fulfilled. If there are failures, a failure signal will be output in step S7. This may be the case for example due to measurement failures. In such a case, the method can start again as step S1.

If the target stabilization time is not yet reached, the proportional speed gain and the dependent parameters are updated in step S6 and the method continues with the next measurement in step S2.

If the target stabilization time is reached, the method will end in step S8 with a success.

Figure 5:
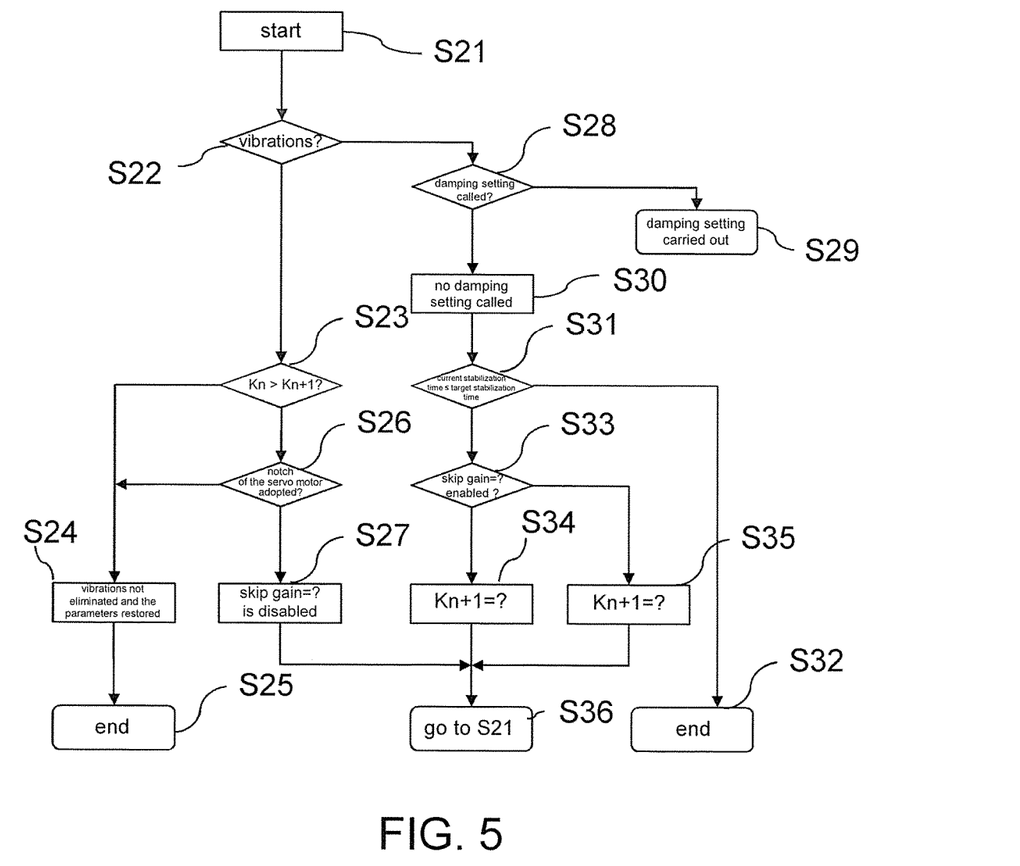
FIG. 5 shows a second example of a method for tuning a servo motor.

FIG. 5 shows a second example of a method for tuning a servo motor 20.

In step S21, the method is started. In step S22, it is decided whether vibrations are detected. This step may be carried out simultaneously to the steps S2 to S6 of FIG. 4.

If there are vibrations, the detection unit 14 confirms whether these vibrations can be eliminated using filters by comparing the current proportional speed gain and the newly determined next proportional speed gain in step S23.

If the current proportional speed gain is larger than the newly determined next proportional speed gain, the vibrations are not eliminated and the parameters are restored in step S24, i.e. the previous parameters are used. The method is then aborted in step S25 and the measurements can start again.

If the current proportional speed gain is smaller than the newly determined next proportional speed gain, the vibrations are confirmed. Afterwards, it is checked in step S26 if the notch of the servo motor is adopted.

If no, steps S24 and S25 are carried out.

If the notch is adopted, the detection unit 14 disables the skip step gain determination process in step S27, which means that only the one step gain determination process can be used.

Then, the method ends in step S36 and starts again.

If there are no vibrations detected in step S22, the detection unit 14 checks whether a damping setting is called in step S28. If a damping setting is called, the servo motor 20 is instructed to reduce damping. If the damping setting is called, the damping setting is carried out in step S29. Afterwards, the method can start again.

If no damping setting is called, the calculation unit 11 notes, i.e. receives or measures, the current parameters of the servo motor 20 including the stabilization time in step S30.

In step S31, it is checked whether the current stabilization time is less or equal to the target stabilization time.

If this is fulfilled, the method ends in step S32 with a success.

If this is not fulfilled, it is checked whether the skip step gain determination process is enabled in step S33.

If the skip step gain determination process is disabled, for example in step S27, the next proportional speed gain is determined using the one step gain determination process in step S35, which is described above.

If the skip step gain determination process is enabled, the next proportional speed gain is determined using the skip step gain determination process in step S34, which is described above.

After determining the next proportional speed gain in step S34 or S35, the parameters are updated, the control signal is generated and the method starts again (S36).

In summary, the described control device 10 provides the possibility to determine the proportional speed gain dependent on the stabilization time ratio so that the servo motor can be controlled based on the stabilization time ratio. Thus, the stabilization time can be reduced as far as possible while, at the same time, overshoot and resonances of the servo motor 20 can be eliminated or at least reduced.

Although the present invention has been described in accordance with preferred embodiments, it is obvious for the person skilled in the art that modifications are possible in all embodiments.

The invention claimed is:

1. A control device (10) for tuning a servo motor (20), the control device (10) comprising:
a calculation unit (11) configured to determine a current proportional speed gain of the servo motor (20) and to calculate a stabilization time ratio based on a current stabilization time of the servo motor (20) and a target stabilization time, wherein the current stabilization time is a period of time currently required by the servo motor (20) to reach a halt status of the servo motor (20) or a load after having arrived at a target position, and the target stabilization time is a target period of time required by the servo motor (20) to reach the halt status of the servo motor (20) or the load after having arrived at the target position,
a determination unit (12) configured to select a gain determination process based on the calculated stabilization time ratio, to determine a proportional speed gain using the selected gain determination process starting from the current proportional speed gain,
wherein the calculation unit (11) is further configured to update parameters of the servo motor (20) according to the determined proportional speed gain, and
a control unit (13) configured to generate a control signal (2) for controlling the servo motor (20) for driving a load based on the updated parameters,
wherein the determination unit (12) is configured to apply a skip step gain determination process as the selected gain determination process if the stabilization time ratio is above a predetermined reference value,
wherein the skip step gain determination process defines that the determined proportional speed gain is calculated as a function dependent on the stabilization time ratio,
wherein the determination unit (12) is configured to apply a one step gain determination process as the selected gain determination process if the stabilization time ratio is below the predetermined reference value, wherein the one step gain determination process defines that the determined proportional speed gain is calculated as function independent on the stabilization time ratio.

2. The control device (10) according to claim 1, wherein the calculation unit (11) is adapted to initially determine the current proportional speed gain as a fixed initial proportional speed gain based on a user input (1).

3. The control device (10) according to claim 2, further comprising a graphical user interface for receiving the user input (1).

4. The control device (10) according to claim 1, wherein the calculation unit (11) is adapted to initially receive the current proportional speed gain based on an inertia estimation of the servo motor (20).

5. The control device (10) according to claim 1, further comprising:
a detection unit (14) configured to detect whether vibrations affect the servo motor (20) and/or the load and to send a signal to the servo motor (20) for eliminating the detected vibrations.

6. The control device (10) according to claim 5, wherein the detection unit (14) is configured to detect a vibration if a deviation of motor speed between a motor speed command and a motor speed feedback is larger than an acceptable criterion.

7. The control device (10) according to claim 5, wherein the detection unit (14) is configured to detect a vibration if a occurrence number of a zero-cross for a deviation of motor speed is within an acceptable range.

8. The control device (10) according to claim 5, wherein the detection unit (14) is configured to compare the current proportional speed gain and the determined proportional speed gain.

9. The control device (10) according to claim 8, wherein, if the current proportional speed gain is larger than the determined proportional speed gain, the detection unit (14) is configured to send a signal to the control unit (13) to generate the control signal based on previous parameters in case of detected vibrations.

10. The control device (10) according to claim 5, wherein the detection unit (14) is configured to send a signal to the determination unit (12) to determine the determined proportional speed gain after the detected vibrations are eliminated.

11. The control device (10) according to claim 1, wherein the calculation unit (11) is configured to calculate the stabilization time ratio as a quotient between the current stabilization time and the target stabilization time.

12. The control device (10) according to claim 1, wherein the calculation unit (11), the determination unit (12) and the control unit (13) are configured to repeat their functions until the current stabilization time is equal to the target stabilization time.

13. The control device (10) according to claim 1, wherein the determination unit (12) is configured to compare the determined proportional speed gain of the one step gain determination process and the determined proportional speed gain of the skip step gain determination process.

14. The control device according to claim 13, wherein, if the determined proportional speed gain of the one step gain determination process is larger than the determined proportional speed gain of the skip step gain determination process, the determination unit (12) is configured to use the determined proportional speed gain of the one step gain determination process.

15. The control device (10) according to claim 1, wherein the parameters are at least one of a proportional position gain, a velocity control gain, a torque command filter and a position command filter.

16. Method for tuning a servo motor (20), the method comprising:
determining a current proportional speed gain of the servo motor (20),
calculating a stabilization time ratio based on a current stabilization time of the servo motor (20) and a target stabilization time, wherein the current stabilization time is a period of time currently required by the servo motor (20) to reach a halt status of the servo motor (20) or a load after having arrived at a target position, and the target stabilization time is a target period of time required by the servo motor (20) to reach the halt status of the servo motor (20) or the load after having arrived at the target position,
selecting a gain determination process based on the calculated stabilization time ratio,
determining a proportional speed gain using the selected gain determination process starting from the current proportional speed gain,
updating parameters of the servo motor (20) according to the determined proportional speed gain, and
generating a control signal (2) for controlling the servo motor (20) for driving a load based on the updated parameters,
wherein a skip step gain determination process is applied as the selected gain determination process if the stabilization time ratio is above a predetermined reference value,
wherein the skip step gain determination process defines that the determined proportional speed gain is calculated as a function dependent on the stabilization time ratio,
wherein a one step gain determination process is applied as the selected gain determination process if the stabilization time ratio is below a predetermined reference value,
wherein the one step gain determination process defines that the determined proportional speed gain is calculated as function independent on the stabilization time ratio.

17. A computer program product comprising a program code for executing the method for tuning the servo motor (20) according to claim 16 when run on at least one computer.

* * * * *